INVENTOR.
LARRY J. STOLP
BY
ATTORNEY

Dec. 13, 1966   L. J. STOLP   3,291,013
WHEELED COMPACTOR OF THE TRAILER TYPES
Filed March 4, 1964   3 Sheets-Sheet 2

INVENTOR.
LARRY J. STOLP
BY
Daniel K. Kilgore
ATTORNEY

Dec. 13, 1966  L. J. STOLP  3,291,013
WHEELED COMPACTOR OF THE TRAILER TYPES
Filed March 4, 1964  3 Sheets-Sheet 3
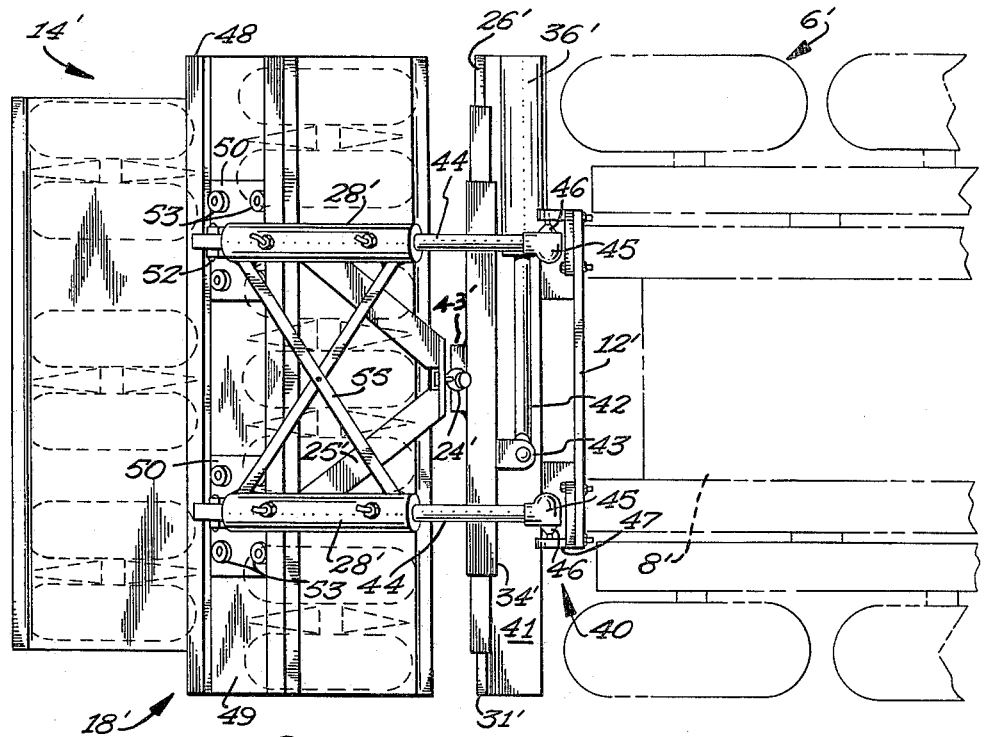
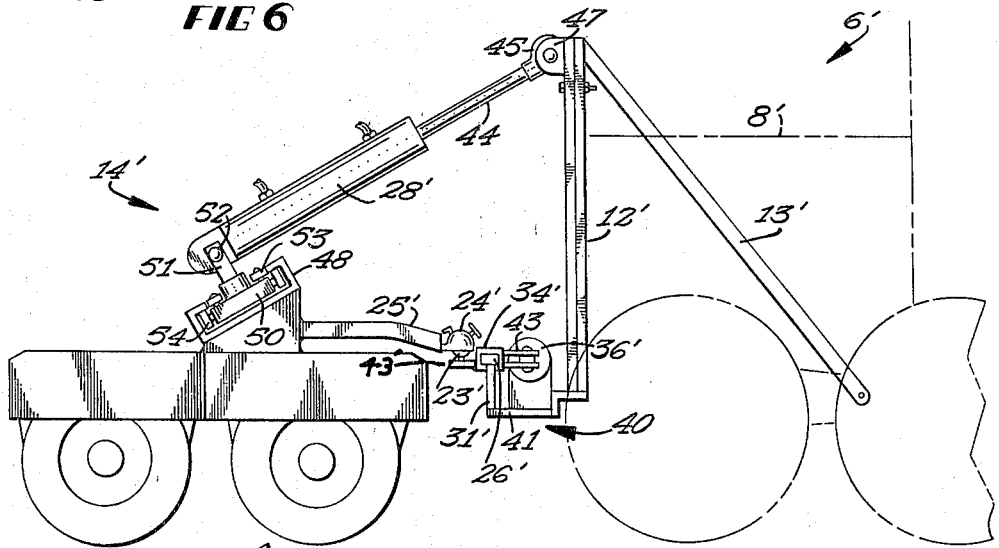
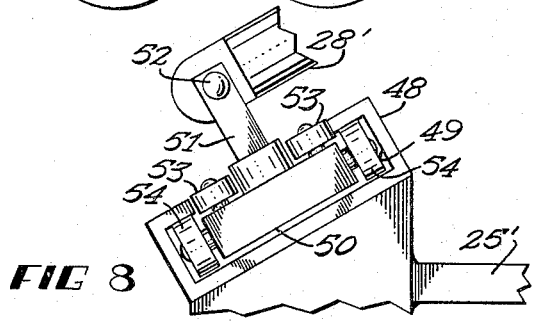
INVENTOR.
LARRY J. STOLP
BY
ATTORNEY

United States Patent Office 3,291,013
Patented Dec. 13, 1966

3,291,013
WHEELED COMPACTOR OF THE TRAILER TYPES
Larry J. Stolp, Oronoco, Minn., assignor of one-half to Harry J. Stolp, Oronoco, Minn.
Filed Mar. 4, 1964, Ser. No. 349,272
6 Claims. (Cl. 94—50)

This inventtion relates broadly to wheeled vehicles, more particularly to such vehicles of the trailer type, and more specifically to wheeled trailer type compactors of the type in general use in road building and the like.

While the compactor or roller of the type described herein is in common use in road building and road maintenance operation, the said equipment now available has many limitations which are now overcome by my present invention.

The principal object of this invention is to provide a compactor unit of the trailer type that is designed to be used with a motor grader having a blade operating ahead of the compactor unit, said motor grader being the prime mover for towing the said compactor unit, however, it is possible that this compactor unit may be self-propelled.

A further object of this invention is to provide a compactor unit of the class described further including means whereby said compactor unit may be selectively raised out of ground engagement for over the road transport or for complicated turning movements.

Another object of this invention is to provide a compactor unit of the class described capable of selective lateral movements relative to the central longitudinal axis of the prime mover.

A further object of this invention is to provide a compactor unit of the class described that may be easily and quickly detached from the prime mover.

A still further object of this invention is to provide a compactor unit that may be connected to the prime mover with a minimum number of parts and without any substantial alteration of said prime mover.

These and other objects of the invention will become apparent from the following specification and claims when taken in conjunction with the appended drawings which form a part of this application and in which drawings, like characters indicate like parts throughout the several views.

To the above end, generally stated, the invention consists of the following devices and combination of devices, hereinafter described and defined in the claims.

Referring to the drawings:

FIG. 6 is a top plan view illustrating a modification of the invention wherein certain elements thereof are mounted directly on the traction unit.

FIG. 7 is a side elevational view of the same and,

FIG. 8 is a fragmentary view of certain elements shown in FIG. 7 on an enlarged scale.

Figure 1:
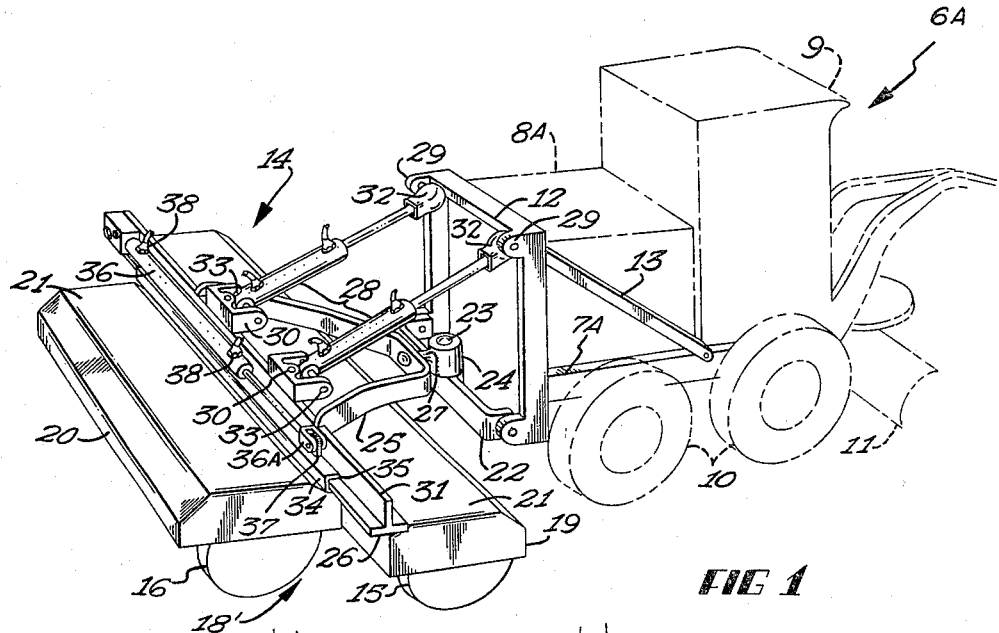
FIG. 1 is a perspective view of the invention attached to a conventional motor grader, the latter being diagrammatically shown.

For the purpose of this application, in the interest of brevity and clarity, the numeral 6 will hereinafter be applied to the motor grader as an entirety, the numeral 7 to the side frame members thereof, the numeral 8 to the motor housing and cooling radiator, and the numeral 9 to the operator's cab. The numeral 10 is directed to the traction wheels of the motor grader 6 and the numeral 11 indicates the blade thereof.

Referring now more specifically to the invention, the reference numeral 12 is directed to a heavy steel mounting frame rigidly secured to the motor grader 6 and positioned to surround the cooling radiator, not shown, at the rear end portion of the motor housing 8. A pair of opposed bracing members 13 extend from the mounting frame 12 to the side frame members 7 of the motor grader 6, and are rigidly secured at the respective end portion of each thereof to the said mounting frame 12 and the side frame members 7. This mounting frame 12 affords the primary mounting means for connecting the compactor unit to the tractive unit heretofore identified as a conventional motor grader 6.

The compactor unit which is the subject matter of this invention, will hereinafter be identified as an entirety by the numeral 14 and at this point it is highly important to understand that the said compactor unit must be capable of following its traction unit 6 through all possible forward trailing and turning movements as well as being capable of being raised out of ground engagement as will presently appear.

Figure 2:
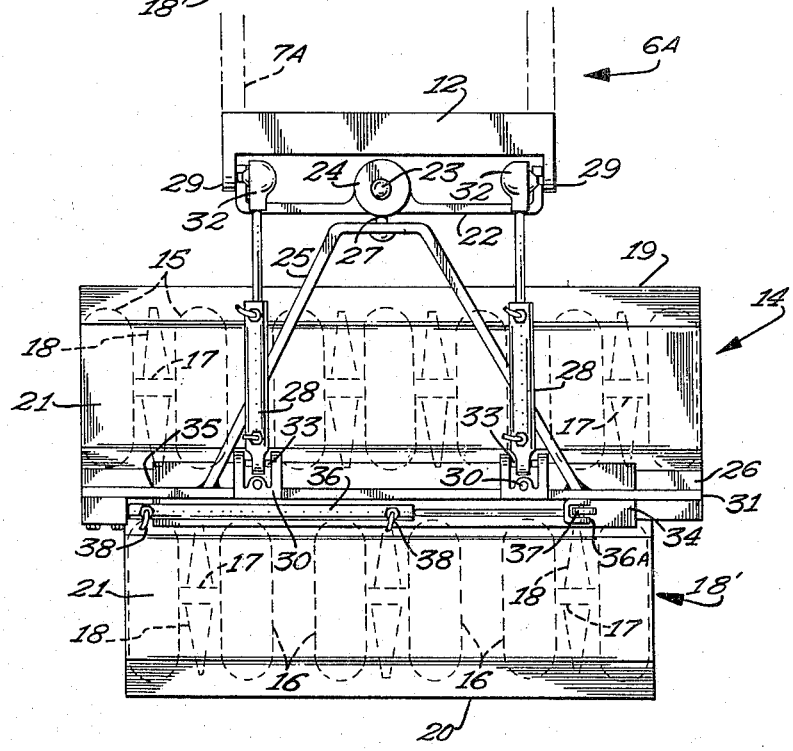
FIG. 2 is a top plan view of the invention attached to a conventional motor grader, the latter being fragmentarily shown.
Figure 3:
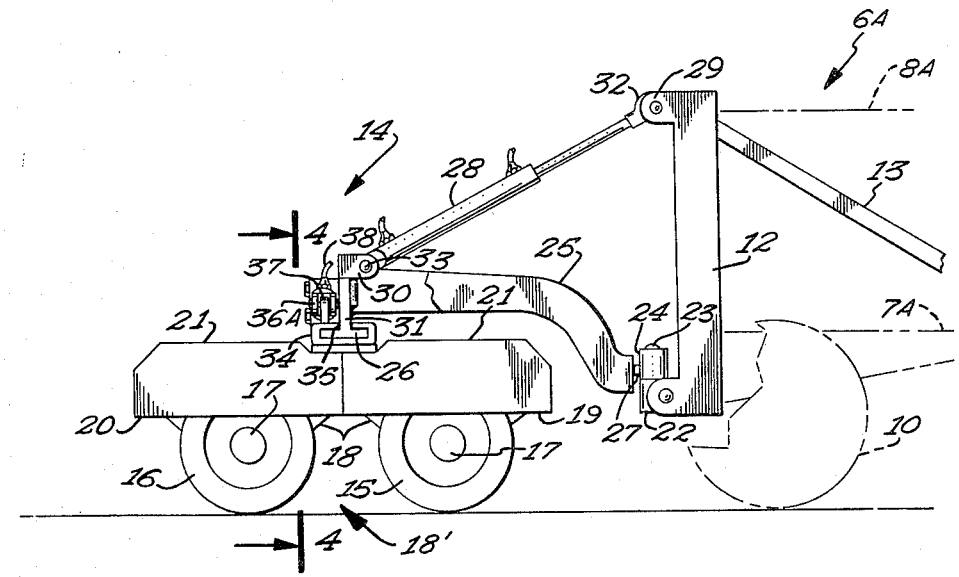
FIG. 3 is a side elevational view of the invention attached to a conventional motor grader, only certain parts of the latter being diagrammatically shown.
Figure 4:
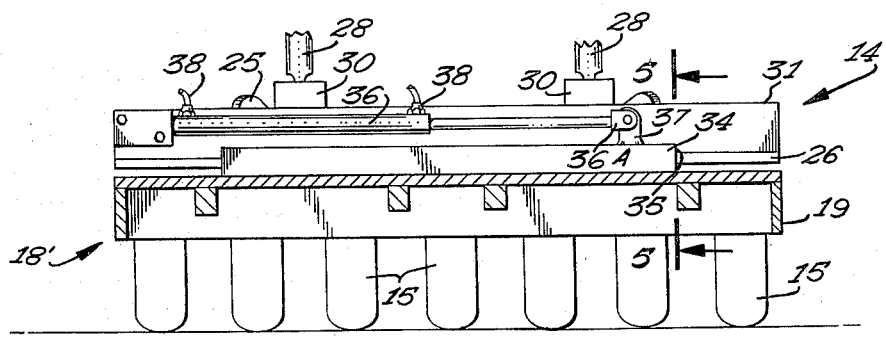
FIG. 4 is a rear elevational view of the invention some parts being broken away and sectioned, taken on the line 4—4 of FIG. 3 and, FIG. 5 is an enlarged fragmentary view partly in section with some parts being broken away, taken on the line 5—5 of FIG. 4.
Figure 5:
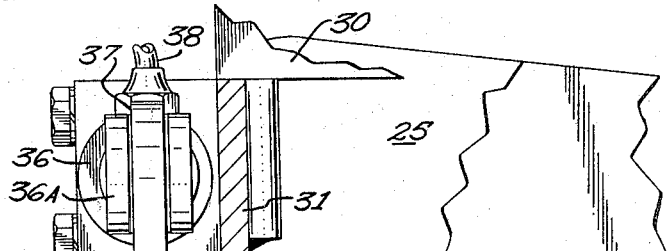

In view of the fact that no new inventive concept is involved, it is not thought to be necessary to enter into a detailed description in this application, of the suspension of the front and rear banks of compactor roller wheels 15 and 16 respectively other than to state that said front and rear banks of roller wheels 15 and 16 are independently mounted in pairs on axles 17 journaled in spring mounted shackles 18 rigidly secured to a chassis frame structure 18' thus permitting the said pairs of compactor roller wheels 15 and 16 to follow ground contours. One exception to this compactor roller wheel arrangement is best seen in FIG. 2 wherein it will be noted that the center group of the compactor roller wheels in the front bank 15 comprises three roller wheels in spaced relation. The purpose of the extra roller wheel in the front bank 15 obviously permits the mounting of the said roller wheels in the rear bank 16 in such a manner as to track on that portion of the ground not covered by the front bank of wheels 15. It will be understood that the front and rear banks of compactor roller wheels are conventionally mounted on the chassis frame structure 18' by means of the springs and shackles 18, and the axles 17 secured thereto.

As shown on the drawing the compactor roller wheel assembly is housed beneath front and read cover members 19 and 20 respectively affording platforms 21, said cover member being capable of modification to afford bins to retain ballast if required.

Secured to the mounting frame 12 at the lower end portion thereof is a heavy transversely disposed cross-bar 22 constructed and arranged for pivotal movements about its transverse axis. This cross-bar 22 affords a mounting station for the ball portion 23 of a ball and socket point that provide the primary means whereby the compactor unit is connected to the traction unit 6. The socket portion 24 of the said ball and socket hitch is secured to a drawbar 25 which is in the form of a A frame the respective legs of which are rearwardly and outwardly projected to a rigid connection with an elongated inverted T-bar 26. It is important to note that the drawbar 25 is connected to the socket 24 by means of a heavy headed stud 27 to thus provide still further pivotal rocking movements of the compactor unit 14 relative to the traction unit 6 to further compensate for uneven ground contours over which the unit may be operating.

Raising and lowering movements of the compactor unit 14 are imparted thereto by means of a pair of double acting hydraulic rams 28 controlled by means of suitable hydraulic connections from the operators cab 9 of the traction unit 6. The rams 28 are pivotally secured at their respective forward end portions to the upper end of the mounting frame 12 at opposite sides thereof, see numeral 29, and secured at their respective rear end portions for pivotal movement to a pair of laterally spaced brackets 30 that are rigidly secured to the upstanding flange 31 of the inverted T-bar 26. It will be understood that the double acting rams may be pivotally mounted on the mounting frame 12 and the T-bar 26 by any one of several conventional means, however, as shown, the forward mounting means 29 comprises ball and socket connections 32 and the rear mounting means as shown, in- includes a pin 33 cooperating with the mounting brackets 30.

As has been stated, one of the principal objects of this invention is to provide for selective lateral movements of the banks of compactor wheels 15 and 16 relative to the respective right and left hand traction wheels 10 of the traction unit 6 thereby making it possible to roller pack rock or gravel on the shoulders for example, of a highway under construction. Heretofore this operation has been difficult and dangerous with the type of equipment presently in use for the reason that such equipment including the traction unit 6 is liable to tip over if the same are operating too close to the edge of said shoulders.

The selective lateral movements of the said compactor roller wheels is accomplished in the present invention by rigidly securing a longitudinally disposed elongated channel 34 to the upper side of the chassis frame structure 18' at a point substantially midway between the front and rear banks of compactor roller wheels 15 and 16. This elongated channel member 34 is provided throughout its entire length with a relatively narrow passageway 35. This channel member 34 is constructed and arranged to receive the inverted T-bar for endwise lateral movements therein, the narrow passageway 35 being provided to afford clearance for the upstanding flange 31 of the inverted T-bar 26.

It will be apparent that with the inverted T-bar 26 rigidly secured to the draw bar 25 and with the elongated channel 34 rigidly secured to the chassis frame structure 18' of the compactor unit 14, the compactor roller wheel assembly comprising the front and rear banks of compactor roller wheels 15 and 16 respectively, the cover members 19 and 20, and the elongated channel 34 is capable of controlled selective lateral movements relative to the inverted T-bar 26 and the transverse center of the traction unit 6.

The said lateral movements of the roller wheel assembly are controlled by means of a double acting hydraulic ram 36 pivotally secured by means of a clevis 36A on the outer end portion of its piston rod to an upstanding bracket 37 rigidly mounted adjacent one outer end portion of the elongated channel 34. The cylinder end portion of said hydraulic ram 36 is rigidly secured to the rearwardly facing side portion of the upstanding flange 31 of the inverted T-bar 26 in laterally opposed relation to the bracket 37. Conventional hydraulic controls in the operator's cab 9 of the traction unit 6 have hydraulic connections 38 with the double acting ram 36 thus affording means whereby right or left hand lateral movements may be selectively imparted to the roller wheel assembly relative to the traction unit as said roller wheel assembly travels with endwise sliding movements in the elongated chanel 34 which, as presented herein, is substantially twenty-seven inches to the right or left of the central longitudinal axis of the combined traction unit 6 and the compactor unit 14.

The modification illustrated in FIGS. 6, 7, and 8, of the drawings embodies the principle of mounting the T-bar 26' directly on the traction unit 6' by means of a heavy transversely disposed mounting bracket 40 rigidly secured to the chassis frame structure 18' rearwardly of the traction wheels 10'. This mounting bracket 40 is further secured to the mounting frame 12' that surrounds the cooling radiator 8' of the traction unit 6' by a pair of lateraly spaced bracing members 13'. It will be noted by reference to FIG. 7 that the mounting bracket 40 also affords a rigid mounting station for a hydraulic ram 36' that imparts lateral movements to certain elements of the invention as will presently appear. It is also important to note that while the T-bar 26 shown in FIGS. 1 through 5 is mounted in an inverted position, the T-bar 26' is mounted on the mounting bracket 40 in FIGS. 6 through 8 in an upright position by means of its depending flange 31'.

A double acting hydraulic ram 36' is mounted on the bracket 40 and as previously described in the first noted version of the invention, the same is provided to impart lateral movements to the compactor unit 14' and its mounted components relative to the traction unit 6'.

Mounted on the upstanding T-bar 26' is a relatively long channel member 34' dimensioned to engage the T-bar 26' with a relatively close working fit thus permitting lateral movements of the same thereon. The said channel 34' on its inner edge portion being provided with a forwardly projecting flange 41 in the form of a fixed clevis 43 whereby the outer end portion of the piston rod 42 of the hydraulic ram 36' is connected to the channel member 34' to impart lateral movements of the said channel on the T-bar 26' when the hydraulic ram 36' is activated. A rearwardly projecting flange 43 is formed in the rear edge portion of the channel member 34' to provide a mounting station for the ball member 23' of a ball and socket connection whereby the traction unit 6' is detachably connected to the compactor unit 14'. The socket member 24' of the said ball and socket connection being rigidly secured to the forward end portion of a draw bar 25' forming a part of the compactor unit 14'.

A laterally opposed pair of hydraulic rams 28' are provided to impart raising and lowering movements of the compactor unit 14' into and out of ground engagement and are provided at the respective outer and forward end portions of the ram piston rods 44 with socket members 45 having engagement with ball hitch members 46 which are secured to brackets 47 rigidly secured to the mounting frame 12'. To permit the lateral movements of the compactor unit 14' relative to the traction unit 6' it is obviously necessary to provide means for permitting such movement without damage to the double acting hydraulic rams 28' during such lateral shifting movements.

To accomplish this I provide a relatively heavy elongated guide member 48 having a longitudinally disposed open channel 49. This guide member 48 is rigidly secured to the frame structure of the compactor unit 14' and preferably extends the full width thereof. This guide member 48 is forwardly and upwardly inclined to generally coincide with the angle of the hydraulic rams 28' as the same extend downwardly and rearwardly from their respective forward mounting stations 45 and 46 substantially to the transverse center of the open channel 49 in the guide member 48.

Constructed and dimensioned to travel with lateral movement within the channel 49 is a relatively heavy block 50, one for each ram 36', preferably round in shape and having an upstanding stem 51 which may be in the form of a clevis or any other suitable means to receive the rear end portion of the cylinder of the double acting rams 36'. These rams are secured to the said upstanding stems 51 by a heavy pin 52 that extends through bores in the clevis and the rear end portion of the said rams thus affording quick detachment of the said rams from the compactor unit 14'.

To overcome the possible tendency of the sliding blocks 50 to bind in the channel 49 the said blocks are provided with upper and side mounted pairs of cam rollers 53 and 54 to facilitate lateral movements of the blocks 50 in the channel 49 when it is desired to shift the compactor unit 14' to either side relative to the traction unit 6' regardless of whether the said compactor unit is in or out of ground engagement.

It will be obvious that it is highly important that when lateral movement is imparted to the compactor unit 14' that the hydraulic rams 28' secured to the blocks 50 are capable of movement in perfect unison as the said blocks travel in the channel 49. To insure this coordinated movement of these elements it is important to note that as shown on the drawing the respective rams 28' are rigidly connected at their cylinder end portions by means of a relatively heavy X frame 55.

It will be obvious from the foregoing descriptions of the two versions of the invention that the compactor unit may be readily and easily disconnected from the traction unit 6 and/or 6' by simply disconnecting the hydraulic rams 28 and 28' and their respective hydraulic connections and the ball and socket hitch assembly from their respective mounting stations.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A compactor unit of the wheeled trailer type adapted to be used with and towed by a traction unit for power and control, said compactor unit comprising, in combination, a compactor wheel chassis frame, a plurality of compactor wheels rotatably mounted on said chassis frame for rotation about an axis transverse to the direction of travel of the traction unit, said compactor wheels independently sprung to permit each of the plurality of compactor wheels to follow ground contours, detachable hitch means affixed to the mounting frame and adapted to be attached on the rear end portion of the traction unit thereby affording a mounting station for said detachable hitch means, means operably connecting the traction unit with said compactor unit whereby said compactor unit and its mounted compactor wheels may be raised or lowered onto or off of ground engagement and shifting means operably connected to the traction unit and the compactor unit whereby said compactor unit and its mounted compactor wheels may be shifted laterally relative to the longitudinal center line of the traction unit in response to manipulation by the operator of the traction unit whereby the operator of the traction unit may raise, and laterally move, said compactor unit to permit turning of the traction unit without damage to the surface compacted by said compactor unit and to permit complete compaction by said compactor unit a predetermined transverse distance from the longitudinal center line of the traction unit.

2. A compactor unit of the wheeled trailer type adapted to be used with a traction unit for power and control, said compactor unit comprising, in combination, a unitary chassis, front and rear banks of compactor wheels independently sprung in laterally disposed groups mounted on said unitary chassis frame, a longitudinally disposed elongated carrier channel rigidly mounted on the upper portion of the chassis frame, said carrier channel having a longitudinal passageway throughout their entire length to receive an inverted fixed T-bar constructed and arranged to permit lateral travel of the elongated carrier channel thereon, lateral reciprocating movement of said channel on the T-bar being imparted by double acting hydraulic ram means rigidly mounted at its cylinder end portion to the upstanding flange of the inverted T-bar and having the outer end portion of its piston rod pivotally secured to a heavy upwardly projecting stud adjacent one end portion of the carrier channel, said lateral reciprocating movements of the carrier channels and its mounted components on the fixed inverted T-bar being selectively imparted by the action of the double acting ram actuated by conventional controls and connections on the traction unit, a rigid frame adapted to be mounted on the rear end portion of the traction unit affording a mounting station for detachable hitch means whereby the compactory unit may be towed by the traction unit, a V-shaped draw bar adapted to be secured at its forward end portion to said detachable hitch means on the mounting frame and rigidly secured at its rear end portion to the upstanding flange of the inverted T-bar, a pair of laterally spaced double-acting hydraulic rams secured at their respective rear end portions to pivotal brackets rigidly secured to said flange of the inverted T-bar and at the forward end portion thereof to a pair of brackets rigidly secured to the mounting frame on said traction unit, said front and rear connections of the hydraulic ram being capable of universal movement, said ram affording means whereby said compactor unit may be selectively raised or lowered relative to the ground.

3. A compactor unit of the trailer type adapted to be towed by a traction unit for power and control, said compactor unit comprising, in combination, a compactor unit having a rigid mounting frame adapted to be mounted on the rear end portion of the traction unit, said compactor unit comprising a unitary chassis frame, compactor wheels adapted to be mounted on the unitary chassis frame of said compactor unit, said compactor wheels arranged in front and rear banks whereby the rear bank is arranged to track in the void between the spaced compactor wheels of said front bank, said front and rear banks of said compactor wheels being independently sprung on spring and shackle assemblies secured to the chassis frame, an elongated carrier channel having a longitudinal passageway formed in the upper surface thereof and extending the full length of said channel, said channel being rigidly secured to the carrier frame chassis substantially between and above the front and rear banks of the compactor wheels, an inverted T-bar dimensioned and arranged to engage the channel of the carrier with a relatively close working fit to permit endwise lateral movements of the carrier channel and its mounted components thereon, said T-bar having a substantially V-shaped draw bar rigidly secured thereto at its longitudinal center, said draw bar projecting forwardly and terminating in hitch means adapted to be detachably engaged with co-operating hitch means adapted to be mounted on the traction unit, a double-acting hydraulic ram mounted at one end portion thereof on the T-bar and the other end portion thereof secured by flexible means to the carrier channel, hydraulic connection and controls whereby reciprocating lateral movement is imparted to the carrier channel to permit travel on the T-bar, a pair of laterally spaced double acting hydraulic rams secured at their respective rear end portions to brackets rigidly secured to the upstanding flange of the inverted T-bar and at the forward end portion thereof to a flexible connection with the upper portions of the mounting frame on the traction unit, said spaced pair of hydraulic rams activated by control means adapted to be mounted on the traction unit whereby the compactor may be selectively raised or lowered onto or off of ground engagement and to a predetermined lateral position spaced transversely a predetermined distance from the longitudinal center line of the traction unit.

4. The structure of claim 3 including platform means mounted on the chassis frame of said compactor unit, said platform means adapted to retain a quantity of ballast whereby the weight of said compactor unit may be varied to suit operating requirements.

5. A comparator unit of the wheeled trailer type adapted to be towed by a traction unit for power and control, said compactor unit comprising, in combination, a unitary chassis frame, a plurality of compactor wheels arranged in front and rear banks rotatably mounted on said unitary chassis frame whereby the rear bank is arranged to track in the void between the spaced compactor wheels of said front bank, said front and rear banks of compactor wheels being independently sprung on spring and shackle assemblies affixed to the unitary chassis frame, a transverse mounting bracket affixed to the lower edge portion of the mounting frame on said bracket having a double acting hydraulic ram secured thereto at one end portion thereof, the piston end of said ram connected at its outer end portion with forwardly projecting means formed on an elongated channel member constructed and arranged for reciprocal lateral movement on a T-bar rigidly secured to the rear edge portion of the mounting bracket, said hydraulic ram having control means operably connected thereto and mounted on the traction unit to permit control of reciprocal lateral movements imparted to said elongated channel, hitch means on the rear edge portion of said elongated channel adapted to cooperate with hitch means on the forward end portion of a draw bar rigidly secured at its rear end portions to a second relatively long transversely disposed forwardly and upwardly inclined channel having a longitudinal passageway, said channel being secured to the chassis frame of the compactor unit substantially between the front and rear banks of compactor wheels, said draw bar adapted to be attached to the traction unit whereby the comparator unit may be towed by the traction unit, a pair of laterally spaced double acting hydraulic rams rigidly connected at their respective cylinder end portions by frame means maintaining said cylinders in a predetermined spaced relation, the forward end portions of the piston rods of said rams being provided with socket members having engagement with ball members of a flexible connection mounted on brackets at the upper end outer edge portions of the mounting frame of the traction unit, a movable block constructed and arranged for lateral movement in the longitudinal passageway of the second elongated channel, said movable block having an upstanding stem in the form of a clevis to receive the rear end portions of the cylinders of said pairs of hydraulic rams whereby the movable blocks and hydraulic rams are free to travel with reciprocal lateral movement induced by the action of the first hydraulic ram on the first channel traveling on the T-bar mounted on the bracket of the mounting frame.

6. The structure of claim 5 further including horizontally and vertically disposed pairs of cam rollers on each movable blocks, said cam rollers having engagement with the bearing surfaces of the last noted elongated channel to overcome the tendency of the movable block to bind in said channel during lateral movements thereof.

References Cited by the Examiner
UNITED STATES PATENTS

| | | | |
|---|---|---|---|
| 2,024,184 | 12/1935 | Ritchie | 94—50 |
| 2,127,485 | 8/1938 | Owens | 94—50 |
| 2,386,025 | 10/1945 | Wills | 94—50 |
| 2,882,623 | 4/1959 | Gardner | 94—50 |
| 2,966,948 | 1/1961 | Ulsh | 94—50 X |
| 3,071,051 | 1/1963 | Martin | 94—50 |

CHARLES E. O'CONNELL, *Primary Examiner.*

N. C. BYERS, *Assistant Examiner.*